US011593822B2

(12) United States Patent
Achar et al.

(10) Patent No.: US 11,593,822 B2
(45) Date of Patent: Feb. 28, 2023

(54) METHOD AND SYSTEM FOR TIME SERIES DATA PREDICTION BASED ON SEASONAL LAGS

(71) Applicant: Tata Consultancy Services Limited, Mumbai (IN)

(72) Inventors: Avinash Achar, Chennai (IN); Soumen Pachal, Chennai (IN); Antony Joshini Lobo, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/481,854

(22) Filed: Sep. 22, 2021

(65) Prior Publication Data
US 2022/0327560 A1    Oct. 13, 2022

(30) Foreign Application Priority Data
Mar. 4, 2021    (IN) .............................. 202121009109

(51) Int. Cl.
*G06Q 30/02*    (2023.01)
*G06Q 30/0202*    (2023.01)

(52) U.S. Cl.
CPC ................................ *G06Q 30/0202* (2013.01)

(58) Field of Classification Search
None
See application file for complete search history.

(56) References Cited

U.S. PATENT DOCUMENTS

| 10,198,339 | B2 | 2/2019 | Salunke et al. | |
| 2009/0094025 | A1* | 4/2009 | Yamaura | G10L 19/125 |
| | | | | 704/219 |
| 2015/0212974 | A1* | 7/2015 | Wood, III | G06F 17/18 |
| | | | | 703/2 |
| 2021/0241916 | A1* | 8/2021 | Wexler | A61B 5/021 |

OTHER PUBLICATIONS

Krastanov et al. (Deep Neural Network Probabilistic Decoder for Stabilizer Codes, Scientific Reports, Article No. 11003, Published Sep. 8, 2017, pp. 1-7).*
Paulo Cortez, "Sensitivity Analysis for Time Lag Selection to Forecast Seasonal Time Series using Neural Networks and Support Vector Machines," International Joint Conference on Neural Networks (IJCNN), Jul. 2010, IEEE, Link: https://core.ac.uk/download/pdf/55611714.pdf.

* cited by examiner

*Primary Examiner* — Matthew D Henry
(74) *Attorney, Agent, or Firm* — Finnegan, Henderson, Farabow, Garrett & Dunner, LLP

(57) ABSTRACT

State of the art systems that are used for time series data prediction have the disadvantage that perform only one step prediction, which has only limited application. Disadvantage of such systems is that extent of applications of such single step predictions are limited. The disclosure herein generally relates to time series data prediction, and, more particularly, to time series data prediction based on seasonal lags. The system processes collected input data and determines order of seasonality of the input data. The system further selects encoders based on the determined order of seasonality and generates input data for a decoder that forms encoder-decoder pair with each of the encoders. The system then generates time series data predictions based on seasonal lag information distributed without redundance between encoder and decoder inputs.

6 Claims, 5 Drawing Sheets

METHOD AND SYSTEM FOR TIME SERIES DATA PREDICTION BASED ON SEASONAL LAGS

PRIORITY CLAIM

This U.S. patent application claims priority under 35 U.S.C. § 119 to: India Application No. 202121009109, filed on Mar. 4, 2021. The entire contents of the aforementioned application are incorporated herein by reference.

TECHNICAL FIELD

The disclosure herein generally relates to time series data prediction, and, more particularly, to time series data prediction based on seasonal lags.

BACKGROUND

Time series data prediction is an approach used to predict future data based on past/historical data. Such predictions generated using the time series data prediction approach can be used for various data analysis purposes to arrive at conclusions aiding business/process. In various scenarios, for example, characteristics of data at a time instance has dependency over past data. For example, in a business scenario, sale of certain goods spike at some specific times. An example is that sale of decorative items spike at the time of New Year celebrations. Analysis of such specific characteristics helps the users plan their activities and in turn strategies accordingly.

State of the art systems which use the time series data prediction are configured to perform only one-step/single-step prediction, which has only limited application and also it is unable to capture the non-linear properties of the data. Also, this kind of system does not consider any kind of non-linear seasonal information. Disadvantage of such systems is that extent of applications of such single step predictions using non-seasonal linear model are limited.

SUMMARY

Embodiments of the present disclosure present technological improvements as solutions to one or more of the above-mentioned technical problems recognized by the inventors in conventional systems. For example, in one embodiment, a processor implemented method for time series data prediction is provided. In this method, initially input data is collected via one or more hardware processors. Further, an order of seasonality in the input data is determined via the one or more hardware processors. A plurality of encoders are then selected, via the one or more hardware processors, wherein number of the plurality of encoders is determined based on the order of seasonality. Further, number of time-steps of each of the plurality of encoders is determined based on corresponding Partial Auto Correlation Function (PACF) significant lags, via the one or more hardware processors. Further, an endogenous part of a historical information used as input to the plurality of encoders is appended with the corresponding exogenous part, via the one or more hardware processors. Further, a combined context vector is generated using a plurality of context vectors obtained from the plurality of encoders, via the one or more hardware processors. Further, an input is generated for a decoder that forms an encoder-decoder pair with the plurality of encoders, by appending the combined context vector with a plurality of seasonal lags synchronized with an associated multi-step target at output of the decoder by a period or integral multiple of the period behind current position, via the one or more hardware processors, wherein number of the plurality of seasonal lags is equal to value of the determined order of seasonality. A plurality of network parameters of the encoder-decoder pair are then trained using back-propagation through time, via the one or more hardware processors. Further, a plurality of the time series data predictions are generated based on the seasonal lag information distributed without redundance between the encoder and decoder inputs, via the one or more hardware processors.

In another aspect, a system for time series data prediction is provided. The system includes one or more hardware processors, a communication interface, a plurality of encoders, a decoder, and a memory storing a plurality of instructions. The plurality of instructions when executed, cause the one or more hardware processors, the plurality of encoders, and the decoder to perform the time series data prediction by executing the following steps. Initially input data is collected via one or more hardware processors. Further, an order of seasonality in the input data is determined via the one or more hardware processors. A plurality of encoders are then selected, via the one or more hardware processors, wherein number of the plurality of encoders is determined based on the order of seasonality. Further, number of time-steps of each of the plurality of encoders is determined based on corresponding Partial Auto Correlation Function (PACF) significant lags, via the one or more hardware processors. Further, an endogenous part of a historical information used as input to the plurality of encoders is appended with the corresponding exogenous part, via the one or more hardware processors. Further, a combined context vector is generated using a plurality of context vectors obtained from the plurality of encoders, via the one or more hardware processors. Further, an input is generated for a decoder that forms an encoder-decoder pair with the plurality of encoders, by appending the combined context vector with a plurality of seasonal lags synchronized with an associated multi-step target at output of the decoder by a period or integral multiple of the period behind current position, via the one or more hardware processors, wherein number of the plurality of seasonal lags is equal to value of the determined order of seasonality. A plurality of network parameters of the encoder-decoder pair are then trained using back-propagation through time, via the one or more hardware processors. Further, a plurality of the time series data predictions are generated based on the seasonal lag information distributed without redundance between the encoder and decoder inputs, via the one or more hardware processors.

In yet another aspect, a non-transitory computer readable medium for time series data prediction is provided. The non-transitory computer readable medium includes a plurality of instructions. The plurality of instructions when executed, cause one or more hardware processors to perform the time series data prediction by executing the following steps. initially input data is collected via one or more hardware processors. Further, an order of seasonality in the input data is determined via the one or more hardware processors. A plurality of encoders are then selected, via the one or more hardware processors, wherein number of the plurality of encoders is determined based on the order of seasonality. Further, number of time-steps of each of the plurality of encoders is determined based on corresponding Partial Auto Correlation Function (PACF) significant lags, via the one or more hardware processors. Further, an endogenous part of a historical information used as input to the plurality of encoders is appended with the corresponding exogenous part, via the one or more hardware processors. Further, a combined context vector is generated using a plurality of context vectors obtained from the plurality of encoders, via the one or more hardware processors. Further, an input is generated for a decoder that forms an encoder-decoder pair with the plurality of encoders, by appending the combined context vector with a plurality of seasonal lags synchronized with an associated multi-step target at output of the decoder by a period or integral multiple of the period behind current position, via the one or more hardware processors, wherein number of the plurality of seasonal lags is equal to value of the determined order of seasonality. A plurality of network parameters of the encoder-decoder pair are then trained using back-propagation through time, via the one or more hardware processors. Further, a plurality of the time series data predictions are generated based on the seasonal lag information distributed without redundance between the encoder and decoder inputs, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
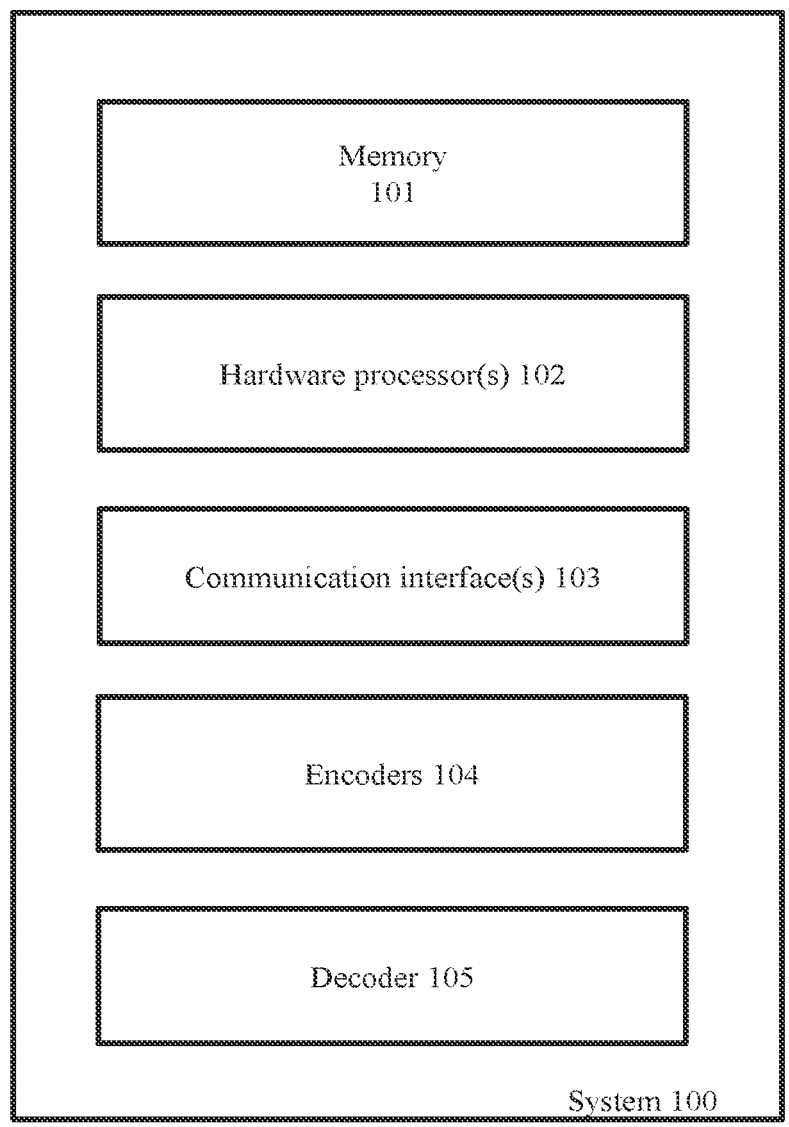
FIG. 1 illustrates an exemplary system for time series data prediction, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system for time series data prediction, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

Figure 3:
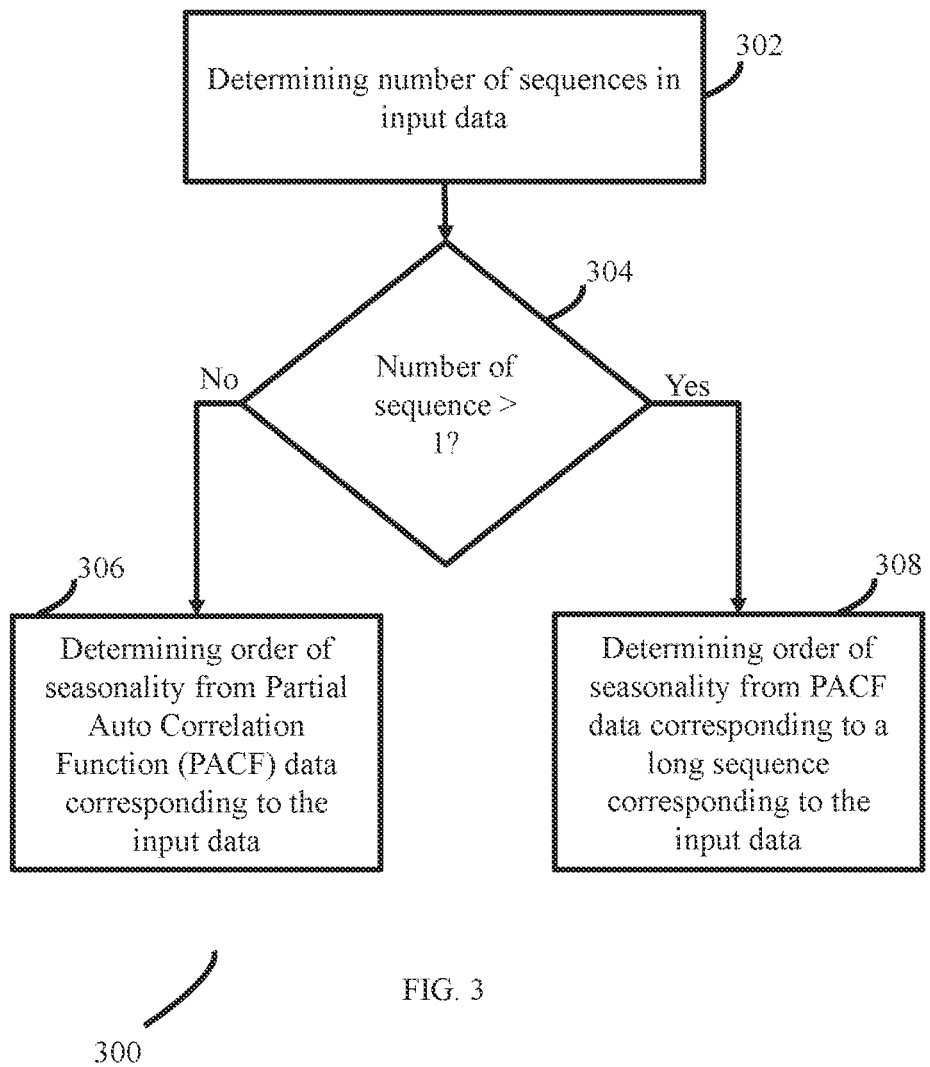
FIG. 3 is a flow diagram depicting steps involved in the process of determining order of seasonality from the input data, by the system of FIG. 1, according to some embodiments of the present disclosure.
Figure 4:
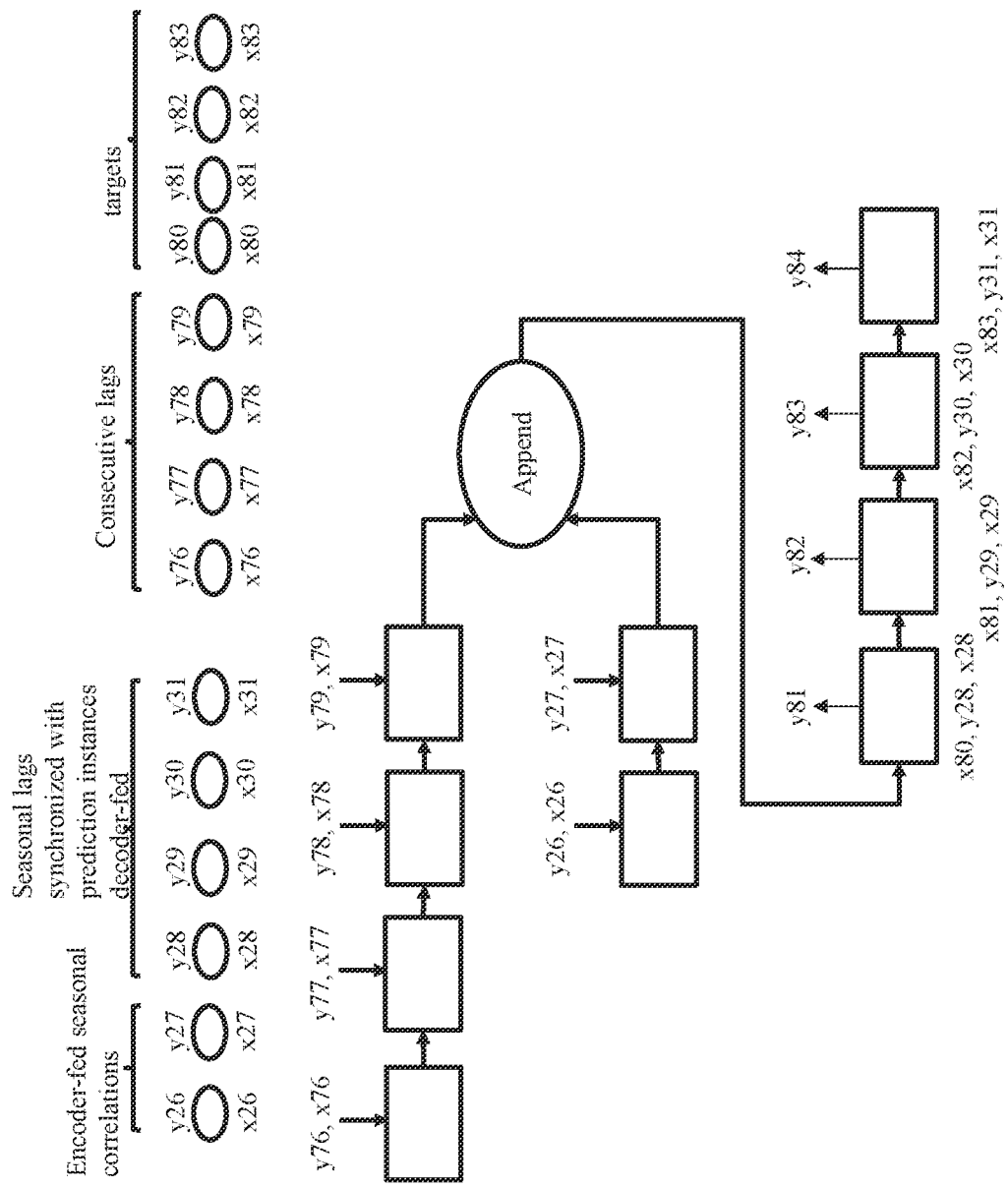
FIG. 4 illustrates an example of the encoder-decoder architecture used by the system of FIG. 1, in accordance with some embodiments of the present disclosure.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of time series data prediction, being performed by the system 100. The system 100 can be implemented in a variety of ways as per requirements. An encoder-decoder architecture that may be used by the system 100 to perform the time series data prediction is depicted in FIG. 4. Various steps involved in the process of the time series data prediction being performed by the system 100 of FIG. 1 are depicted in FIGS. 2 and 3, and are explained with reference to the hardware components depicted in FIG. 1 and FIG. 4.

Figure 2A:
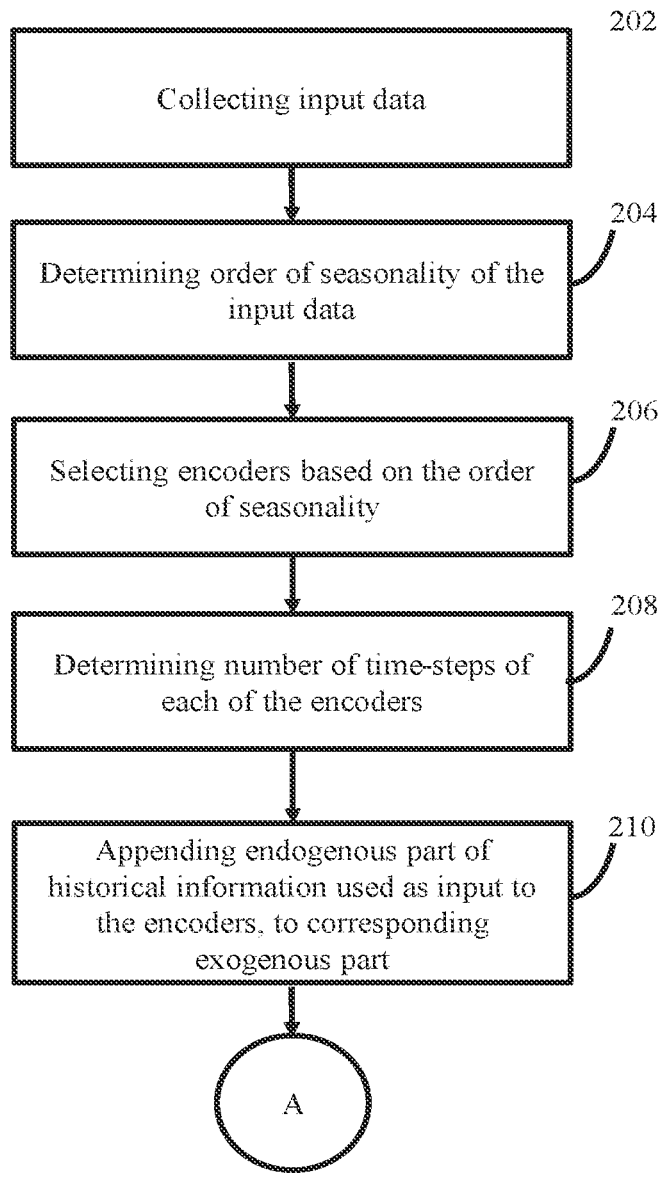
FIGS. 2A and 2B (collectively referred to as FIG. 2) is a flow diagram depicting steps involved in the process of generating the time series data predictions by the system of FIG. 1, according to some embodiments of the present disclosure.
Figure 2B:
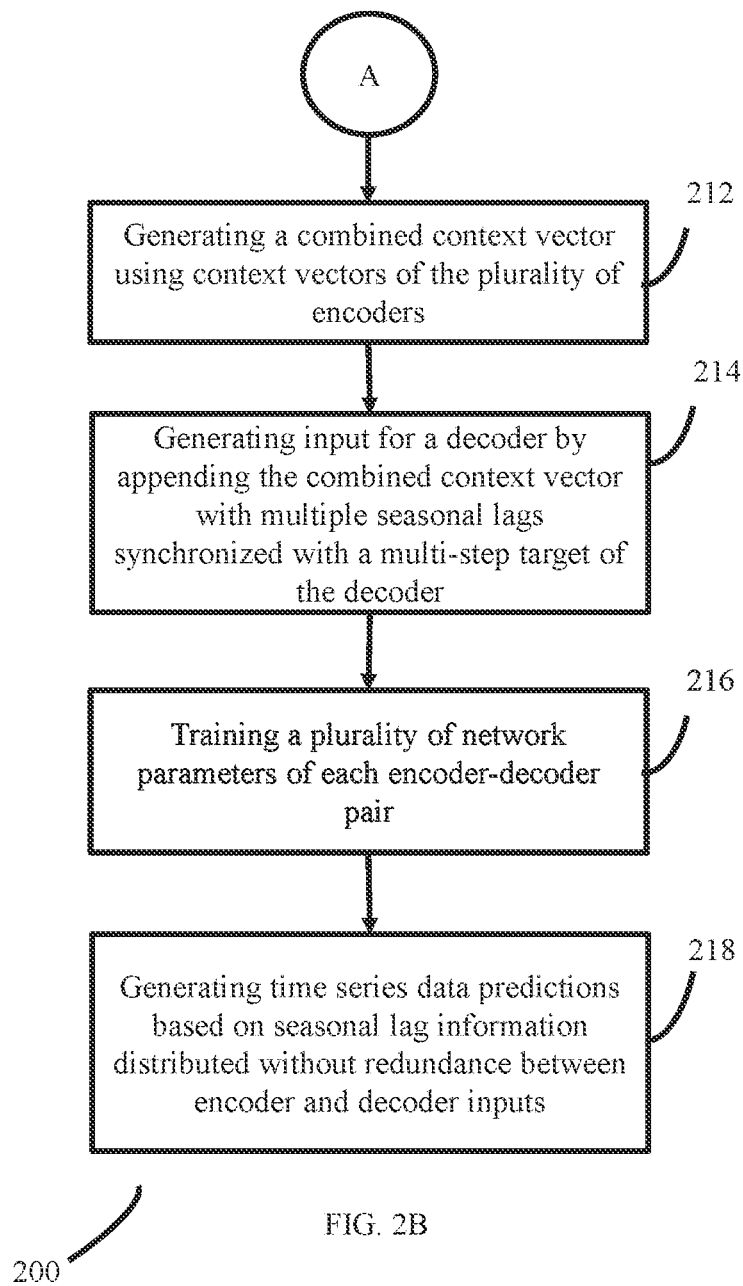

FIGS. 2A and 2B (collectively referred to as FIG. 2) is a flow diagram depicting steps involved in the process of generating the time series data predictions by the system of FIG. 1, according to some embodiments of the present disclosure.

At step 202, the system 100 collects input data. The input data may be a seasonal time series data. The input data may contain only one sequence of data or a plurality of sequences of data. The system 100 processes the collected input data and at step 204, determines an order of seasonality of the input data. Steps involved in the process of determining the order of seasonality are depicted in FIG. 3. At step 302, the system 100 checks and determines number of sequences in the input data. In one embodiment, the input data contains only one sequence. In another embodiment, the input data contains multiple sequences. If the number of sequence is 1 (i.e. there is only one sequence in the input data), then the system 100 determines the order of seasonality from Partial Auto Correlation Function (PACF) of the input data, at step 306. If there is more than one sequence in the input data, then at step 308, the system 100 generates a long sequence by appending all the sequences in the input data, and then from PACF of the long sequence, the order of seasonality is determined.

Further, at step 206, the system 100 selects a plurality of encoders. The system 100 determines the number of encoders based on number of order of seasonality (P). To determine the number of encoders to be used, the system 100 determines order of seasonality based on data generated at step 204, by the method used (i.e. PACF in this example). If determined order of seasonality is 'P', then the system 100 selects 'P+1' encoders.

At step 208, the system 100 determines number of time steps for each of the plurality of encoders, based on corresponding Partial Auto Correlation Function (PACF) significant lags. Further, at step 210, the system 100 appends an endogenous part of a historical information used as input to the plurality of encoders, to corresponding exogenous part. At step 212, the system 100 generates a combined context vector using context vectors from the plurality of encoders.

The system 100 uses an encoder-decoder architecture to process the input data. At step 214, the system 100 generates input for a decoder that forms an encoder-decoder pair with the plurality of encoders, by appending the combined context vector with a plurality of seasonal lags synchronized with an associated multi-step target at output of the decoder by a period or integral multiple of the period behind current position. Here, number of the plurality of seasonal lags is equal to value of the determined order of seasonality. Further, at step 216, the system 100 trains a plurality of network parameters of the encoder-decoder pair using a standard back-propagation through time approach. Further, at step 218, the system 100 generates a plurality of time series data predictions, based on the seasonal lag information distributed without redundance between the encoder and decoder inputs.

The method 200 is explained in algorithm format below:
The encoder-decoder architecture in FIG. 4 is modeled as a seasonal nonlinear autoregressive exogenous (NARX) model. The seasonal NARX model is partially motivated from a standard multiplicative SAR model. The SAR model satisfies the condition in (1).

$$(1-\psi_1 L - \ldots -\psi_p L^p)(1-\psi_1 L^S - \ldots -\psi_P L^{PS})y(t)=e(t) \quad (1)$$

Where e(t) is zero mean, white noise process with unknown variance $\sigma_e^2$. $L^p$ is a one-step delay operator applied p times i.e. $L^p y(t)=y(t-p)$. In the multiplicative SAR model represented by (1), auto-regressive term is a multiplication of two lag polynomials: a) first capturing the standard lags upto p, b) second capturing influence of seasonal lags at multiples of the period S and order upto P. The polynomials of (1) are expanded as given in (2):

$$y(t)=a_1 y(t-1)+a_2 y(t-2)+ \ldots +a_p y(t-p)+b_0^1 y(t-S)+b_1^1 y(t-S-1)+ \ldots +b_p^1 y(t-S-p)+ \ldots +b_0^P y(t-PS)+b_1^P y(t-PS-1)+ \ldots +b_p^P y(t-PS-p)+e(t) \quad (2)$$

In (1) and (2), value of p used is significantly less than value of S. y(t) is auto-regressed with respect to: a) p previous values of y(t), b) values for a period of S behind upto P cycles, and c) P groups of p consecutive values, where each group is immediately previous to one of the measurements of the values for a period of S. The multiplicative SAR model was generalized with an assumption that all coefficients in equation (s) are unconstraint. The multiplicative SAR model was further generalized with an assumption that the P groups of consecutive values need not be of size p. These generalizations are represented in equation (3).

$$y(t)=a_1 y(t-1)+ \ldots +a_p y(t-p)+b_0^1 y(t-S)+b_1^1 y(t-S-1)+ \ldots +b_{Q_1}^1 y(t-S-Q_1)+ \ldots +b_0^P y(t-PS)+b_1^P y(t-PS-1)+ \ldots +b_{Q_P}^P y(t-PS-Q_P)+e(t) \quad (3)$$

Where $Q_k$ denotes size of $k^{th}$ group. The architecture of FIG. 3 adopts a non-linear auto-regression version of equation (3). In presence of exogenous variable x(t), the architecture in FIG. 4 regresses y(t) with respect to x(t).

To accurately generate the time series data predictions, a data model used in the architecture of FIG. 3 is trained with vector-valued targets, wherein the vector size is equal to a prediction horizon. The system may use classical Seq2Seq for machine translation, which can inherently tackle input-output pairs of variable sizes. The data model can be adapted to a multi-horizon time series context where the decoder is unfolded as much as the prediction horizon. In addition, exogenous inputs were collected and used during the prediction, as additional inputs, at the respective time-steps of the decoder.

In this example scenario being considered, multiple encoders are selected depending on the order P of the model. The model has P+1 encoders, where a first encoder of the plurality of encoders takes the immediate p consecutive lags as inputs, while amongst the remaining P encoders, the $k^{th}$ encoder takes $Q_k$ inputs from the consecutive seasonal lags exactly k cycles behind. All the associated exogenous inputs at various time steps also are fed to the decoder. The context vectors obtained at the last time-step of each of these P+1 encoders are appended before feeding further as the initial state for the first time-step of the decoder. To ensure better learning, the appended context vector also is additionally fed as an input at each time step of the decoder.

The architecture depicted in FIG. 4 is for a P=1 case. A moving window approach is adopted and a training example is formed from every possible window in the input time series data. FIG. 4 illustrates an input-output pair (OR a fixed window) where forecast start time is kept as 80 (any suitable value can be configured) and prediction horizon is kept as 4. The period S is assumed 52 (a yearly seasonality for instance). The example assumes p=4 (standard immediate auto-regressive lags) and the associated sequential information is fed into the first encoder. The example assumes Q1=2 and the associate lags come from time instants 27, 26. The lags selected are lags which are just more than a period (52) behind the first time point of the prediction horizon (namely 80). The one-step multiplicative model to predict for the prediction horizon of 80 needs data from exactly one cycle behind (28) and Q1 lags preceding it. It is to be noted that the values of the different parameters mentioned are for example purpose only, and does not intend to restrict scope of protection in any manner. These Q1 lags are invariant to the prediction horizon length. This is the reason these Q1 lags are fed as a separate encoder. It's immediately succeeding lags are fed to the decoder as they can be exactly matched (OR synchronized) with one of the multi-step targets which are exactly one period away. For this reason, data from time points 28 to 31 are fed as decoder inputs from the first to the fourth time-step respectively. Such synchronized inputs at the decoder can additionally come from lags exactly 2S, . . . PS time points behind. This means depending on P, each time step of the decoder receives input from P time points each of which are exactly iS steps behind, where i=1, . . . P.

A first cut choice of P and the length of each of the input encoders (p, $Q_k$ fork=1, P) can be read off from the significant portions of the Partial Auto-correlation Function (PACF in short). However, the weight sharing aspect of recurrent neural networks across time steps permits longer lengths of each of the encoders. While longer length encoders have the advantage of potentially looking for long range correlations, this can lead to lesser training data for training. This trade-off needs to balanced depending on the amount of data in hand for training the model.

Experimental Results:

The following data sets were used during the experiment. Each of these data sets are available from various public sources.

a) Datasets

Dataset 1 (D1): This is publicly available from Walmart. The measurements are weekly sales at a department level of multiple departments across 45 Walmart stores. In addition to sales, there are other related measurements like CPI (consumer price index), mark-down price etc. which we use as exogenous variables for weekly sales prediction. The data is collected across 3 years and it's a multiple time-series data. The whole data set consists of 2826 sequences. For the experiment, data sequences were ranked based on the total variation of the sales and top 20% of the sequences (denoted as D1) were considered for testing. Hardest sequences which exhibit sufficient variation were picked. The total variation of a T length sequence x is defined as:

$$TV = \Sigma_{i=2}^{T} |(x(i+1)) - x(i)| \qquad (4)$$

Dataset 2 (D2): D2 consists of demand data from the National Electricity Market of Australia. Australian geography is split into 5 disjoint regions, which means there are 5 power demand time series including an aggregate temperature time-series in each of these regions. This is a single time-series dataset consisting of 5 independent single time-series. D2 is 3 months of summer data (December to February) from 3 of these regions. The granularity of the time-series here is half-hourly. The last 2 weeks were kept aside for testing.

The architecture was tested on D1 using a state-of-the-art algorithm. The seasonal architecture was tested on 3 single time series of D2.

b) Error Metrics and Hyperparameter Choices:

The following two error metrics were considered during the experiment.

MAPE (Mean Absolute Percentage Error)
MASE (Mean Absolute Scale Error)

The APE is essentially relative error (RE) expressed in percentage. If $\hat{X}$ is predicted value, while X is the true value, then $$RE = \frac{(\hat{X} - X)}{X}.$$

In the multi-step setting, APE is computed for each step and is averaged over all steps to obtain the MAPE for one window of the prediction horizon. The APE while has the advantage of being a scale independent metric, can assume abnormally high values and can be misleading when the true value is very low. An alternative complementary error metric which is scale-free could be MASE.

The MASE is computed with reference to a baseline metric. The choice of baseline is typically the copy previous predictor, which just replicates the previous observed value as the prediction for the next step. For a given window of one prediction horizon of K steps ahead, $i^{th}$ step error is denoted as $|\hat{Y}_i - Y_i|$. $i^{th}$ scaled error is defined as:

$$e_s^i = \frac{|\hat{Y}_i - Y_i|}{\frac{1}{n-K}\sum_{j=K+1}^{n} |Y_j - Y_{j-K}|} \qquad (5)$$

where n is the no. of data points in the training set. The normalizing factor is average $i^{th}$ step-ahead error of the copy-previous baseline on the training set. Hence the MASE on a multi step prediction window ω of size K is:

$$MASE(\omega, K) = \frac{1}{K}\sum_{j=1}^{K} e_s^j \qquad (6)$$

c) Seasonal ED Approach

The seasonal approach adopted by the system 100 is denoted by SEDX, which is compared with the following baselines:

BEDX—Basic Encoder Decoder (with only one encoder capturing the immediate lags), while the exogenous inputs of the prediction instants are fed as inputs to the decoder. It is a simplified SEDX with all structures and inputs from the seasonal lags deleted.

BED—BEDX without exogenous inputs.

MTO—Many (L steps) to one architecture with no exogenous input (predicting K-steps ahead), where all K outputs are placed at the last time-step.

SARMAX—Seasonal ARMA with exogenous inputs (strong standard linear time-series baseline).

Results on D1:

Initially, effectiveness of SEDX on D1 is demonstrated. A test size of 15 weeks (time-points) was set aside for each sequence in D1. All sequences (normalized using sequence-specific normalization) were appended into one long sequence and its Partial autocorrelation function (PACF) was considered. This enables fixing of the number of time-steps in the encoders corresponding to the seasonal correlations, which is typically much lesser than the number of time-steps in encoder 1 (which captures standard lags).

Experiments proved that SEDX does better on at least 60% and upto 80% of the sequences compared to some of the standard baselines considered.

Table. 1 gives the average, max and min across sequences (of MASE and MAPE) for all the methods considered. Table. 1 further demonstrates that on an average SEDX does better than all baselines based on both these complementary metrics. MASE improvements are upto 0.24 while the MAPE improvements are upto 13%.

TABLE 1

| Method | MASE based | | | MAPE based in % | | |
|--------|-----|------|------|-----|-----|-----|
|        | Max | Avg  | Min  | Max | Avg | Min |
| SEDX   | 2.65 | 0.52 | 0.1  | 72  | 12  | 2   |
| BEDX   | 2.30 | 0.67 | 0.17 | 178 | 19  | 2   |
| BED    | 2.16 | 0.73 | 0.15 | 176 | 23  | 2   |

TABLE 1-continued

| | MASE based | | | MAPE based in % | | |
|---|---|---|---|---|---|---|
| Method | Max | Avg | Min | Max | Avg | Min |
| MTO | 2.18 | 0.76 | 0.20 | 266 | 25 | 2 |
| SARMAX | 2.39 | 0.56 | 0.11 | 69 | 14 | 2 |

Tab. 2 looks at the (conditional) average MASE under two conditions with respect to each baseline: (i) average over those sequences on which SEDX fares better, (ii) average over those sequences on which the baseline does better. At this level, MASE improvements of at least 0.16 while upto 0.35 are observed. Tab. 3 considers a similar (conditional) average MAPE. At this level of MAPE, there are improvements of at least 5% to upto 17%.

TABLE 2

| | SEDX better | | | Baseline better | | |
|---|---|---|---|---|---|---|
| Method | SEDX | Baseline | Diff | SEDX | baseline | Diff |
| BEDX | 0.44 | 0.69 | 0.25 | 0.81 | 0.59 | 0.22 |
| BED | 0.44 | 0.76 | 0.32 | 0.83 | 0.64 | 0.19 |
| MTO | 0.45 | 0.8 | 0.35 | 0.82 | 0.61 | 0.21 |
| SARMAX | 0.43 | 0.59 | 0.16 | 0.67 | 0.51 | 0.16 |

TABLE 3

| | SEDX better | | | Baseline better | | |
|---|---|---|---|---|---|---|
| Method | SEDX | Baseline | Diff | SEDX | baseline | Diff |
| BEDX | 12 | 21 | 9 | 12 | 9 | 3 |
| BED | 13 | 27 | 14 | 10 | 8 | 2 |
| MTO | 13 | 30 | 17 | 9 | 7 | 2 |
| SARMAX | 11 | 16 | 5 | 14 | 11 | 3 |

Results on D2:

For D2, multi-step horizon was chosen to be 48 to be able to predict a day ahead (each time point is half-hourly demand). There was evidence for seasonal correlations in the ACF in terms of local maxima at lags 48 and 96, and as a result, the seasonal order was selected as (P=2). To choose the length of the associated encoders, significant PACF values just behind the 48th and 96th Lags were considered. Table 4 indicates both the error metrics in comparison to two of the stronger baselines (which were observed to be stronger than the other two in the previous experiment). The obtained results demonstrate superior performance of SEDX again with improvements of upto 0.48 in MASE and 9% in MAPE.

TABLE 4

| Method | Region1 | Region2 | Region3 |
|---|---|---|---|
| SEDX | (0.38, 6) | (0.37, 4) | (0.64, 4) |
| BEDX | (0.58, 8) | (0.46, 5) | (0.69, 5) |
| SARMAX | (0.86, 15) | (0.40, 5) | (1.00, 7) |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of time series data prediction by considering seasonal lags. The embodiment thus provides a mechanism in which multi-step time series prediction is made by a system in response to a time-series data collected as input. Moreover, the embodiments herein further provide a mechanism for generating the time series data predictions based on seasonal lag information and context information pertaining to collected input data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for multi-step time series data prediction, comprising:
    collecting input data, via one or more hardware processors;
    determining an order of seasonality in the input data, via the one or more hardware processors, wherein determining the order of seasonality of the input data comprises:
    determining (302) number of sequences in the input data;
    determining (306) the order of seasonality from PACF values corresponding to the input data, if the determined number of sequences is one; and
    determining (308) the order of seasonality from PACF data corresponding to a long sequence corresponding to the input data, if the determined number of sequences indicates presence of a plurality of sequences in the input data, wherein the long sequence is formed by concatenating the plurality of sequences;
    selecting a plurality of encoders, wherein a number of the plurality of encoders is determined by the order of seasonality plus 1, via the one or more hardware processors;
    determining a number of time-steps of each of the plurality of encoders based on corresponding Partial Auto Correlation Function (PACF) significant lags, via the one or more hardware processors;
    appending an endogenous part of a historical information used as input to the plurality of encoders with a corresponding exogenous part along with a plurality of associated exogenous inputs at the number of time steps, via the one or more hardware processors;
    generating a combined context vector, using a plurality of context vectors obtained from the plurality of encoders, via the one or more hardware processors;
    generating input for a decoder that forms an encoder-decoder pair with the plurality of encoders, by appending the combined context vector with a plurality of seasonal lags synchronized with an associated multi-step target at output of the decoder by a period or integral multiple of the period behind current position, via the one or more hardware processors, wherein number of the plurality of seasonal lags is equal to value of the determined order of seasonality and wherein the seasonal correlations are fed into a +1 encoder and a portion of the combined context vector and seasonal lags are input into the decoder;
    training a plurality of network parameters of the encoder-decoder pair using back-propagation through time, via the one or more hardware processors, wherein the encoder-decoder pair are recurrent neural networks and trained using the back-propagation through time; and
    generating a plurality of the time series data predictions, based on a seasonal lag information distributed without redundance between the encoder and decoder inputs, via the one or more hardware processors; and
    fixing a number of time steps in the plurality of encoders corresponding to one or more seasonal correlations.

2. The method as claimed in claim 1, wherein generating the plurality of time series data predictions comprises generating multi-step time series data predictions.

3. A system for multi-step time series data prediction, comprising:
    one or more hardware processors;
    a communication interface;
    a plurality of encoders;
    a decoder; and
    a memory storing a plurality of instructions, wherein the plurality of instructions when executed, cause the one or more hardware processors, the plurality of encoders, and the decoder to perform the time series data prediction by:
    collecting input data, via one or more hardware processors, wherein
    determining the order of seasonality of the input data comprises:
    determining (302) number of sequences in the input data;
    determining (306) the order of seasonality from PACF values corresponding to the input data, if the determined number of sequences is one; and
    determining (308) the order of seasonality from PACF data corresponding to a long sequence corresponding to the input data, if the determined number of sequences indicates presence of a plurality of sequences in the input data, wherein the long sequence is formed by concatenating the plurality of sequences;
    determining an order of seasonality in the input data, via the one or more hardware processors;
    selecting a plurality of encoders, wherein a number of the plurality of encoders is determined by the order of seasonality plus 1, via the one or more hardware processors;
    determining a number of time-steps of each of the plurality of encoders based on corresponding Partial Auto Correlation Function (PACF) significant lags, via the one or more hardware processors;
    appending an endogenous part of a historical information used as input to the plurality of encoders with a corresponding exogenous part along with a plurality of associated exogenous inputs at the number of time steps, via the one or more hardware processors;
    generating a combined context vector, using a plurality of context vectors obtained from the plurality of encoders, via the one or more hardware processors;
    generating input for a decoder that forms an encoder-decoder pair with the plurality of encoders, by appending the combined context vector with a plurality of seasonal lags synchronized with an associated multi-step target at output of the decoder by a period or integral multiple of the period, via the one or more hardware processors, wherein number of the plurality of seasonal lags is equal to value of the determined order of seasonality and wherein the seasonal correlations are fed into a +1 encoder and a portion of the combined context vector and seasonal lags are input into the decoder;

training a plurality of network parameters of the encoder-decoder pair using back-propagation through time, via the one or more hardware processors, wherein the encoder-decoder pair are recurrent neural networks and trained using the back-propagation through time; and generating a plurality of the time series data predictions, based on a seasonal lag information distributed without redundance between the encoder and decoder inputs, via the one or more hardware processors, and fixing a number of time steps in the plurality of encoders corresponding to one or more seasonal correlations.

4. The system as claimed in claim 3, wherein the system generates multi-step time series data predictions as the plurality of time series data predictions.

5. A non-transitory computer readable medium for multi-step time series data prediction, wherein the non-transitory computer readable medium comprising a plurality of instructions, which when executed, cause:

collecting input data, via one or more hardware processors;

determining an order of seasonality in the input data, via the one or more hardware processors, wherein determining the order of seasonality of the input data comprises:

determining (302) number of sequences in the input data;

determining (306) the order of seasonality from PACF values corresponding to the input data, if the determined number of sequences is one; and determining (308) the order of seasonality from PACF data corresponding to a long sequence corresponding to the input data, if the determined number of sequences indicates presence of a plurality of sequences in the input data, wherein the long sequence is formed by concatenating the plurality of sequences;

selecting a plurality of encoders, wherein a number of the plurality of encoders is determined by the order of seasonality plus 1, via the one or more hardware processors;

determining a number of time-steps of each of the plurality of encoders based on corresponding Partial Auto Correlation Function (PACF) significant lags, via the one or more hardware processors;

appending an endogenous part of a historical information used as input to the plurality of encoders with a corresponding exogenous part along with a plurality of associated exogenous inputs at the number of time steps, via the one or more hardware processors;

generating a combined context vector, using a plurality of context vectors obtained from the plurality of encoders, via the one or more hardware processors;

generating input for a decoder that forms an encoder-decoder pair with the plurality of encoders, by appending the combined context vector with a plurality of seasonal lags synchronized with an associated multi-step target at output of the decoder by a period or integral multiple of the period behind current position, via the one or more hardware processors, wherein number of the plurality of seasonal lags is equal to value of the determined order of seasonality and wherein the seasonal correlations are fed into a +1 encoder and a portion of the combined context vector and seasonal lags are input into the decoder;

training a plurality of network parameters of the encoder-decoder pair using back-propagation through time, via the one or more hardware processors, wherein the encoder-decoder pair are recurrent neural networks and trained using the back-propagation through time; and generating a plurality of the time series data predictions, based on a seasonal lag information distributed without redundance between the encoder and decoder inputs, via the one or more hardware processors; and fixing a number of time steps in the plurality of encoders corresponding to one or more seasonal correlations.

6. The non-transitory computer readable medium as claimed in claim 5, wherein the non-transitory computer readable medium generates the plurality of time series data predictions by generating multi-step time series data predictions.

* * * * *